US009954739B2

(12) United States Patent
Khanna

(10) Patent No.: US 9,954,739 B2
(45) Date of Patent: Apr. 24, 2018

(54) SUBSCRIPTION OPTIMIZER

(71) Applicant: TiVo Solutions Inc., San Carlos, CA (US)

(72) Inventor: Raj Khanna, Santa Clara, CA (US)

(73) Assignee: TIVO SOLUTIONS INC., San Jose, CA (US)

(*) Notice: Subject to any disclaimer, the term of this patent is extended or adjusted under 35 U.S.C. 154(b) by 149 days.

(21) Appl. No.: 15/162,413

(22) Filed: May 23, 2016

(65) Prior Publication Data
US 2017/0339020 A1 Nov. 23, 2017

(51) Int. Cl.
G06F 15/16 (2006.01)
G06F 17/30 (2006.01)
H04L 12/24 (2006.01)
H04L 29/08 (2006.01)

(52) U.S. Cl.
CPC .......... *H04L 41/12* (2013.01); *H04L 67/10* (2013.01); *H04L 67/22* (2013.01); *H04L 67/306* (2013.01)

(58) Field of Classification Search
USPC ................. 709/217, 206, 246, 202
See application file for complete search history.

(56) References Cited

U.S. PATENT DOCUMENTS

| 7,970,648 | B2* | 6/2011 | Gailey | G06F 17/3087 455/414.1 |
| 9,407,355 | B1* | 8/2016 | Lerner | H04B 7/18595 |
| 2006/0069702 | A1* | 3/2006 | Moeller | G06F 9/542 |
| 2009/0049051 | A1* | 2/2009 | Horowitz | G06F 17/30035 |
| 2009/0119268 | A1* | 5/2009 | Bandaru | G06F 17/2745 705/7.12 |
| 2009/0160859 | A1* | 6/2009 | Horowitz | G06T 11/206 345/440 |
| 2010/0241717 | A1* | 9/2010 | Hawkins | G06F 9/542 709/206 |
| 2013/0275198 | A1* | 10/2013 | Zeto, III | G06Q 30/02 705/14.26 |
| 2014/0351002 | A1* | 11/2014 | Pessis | G06Q 30/0201 705/7.29 |
| 2016/0092852 | A1* | 3/2016 | Boggs | G06Q 20/10 705/39 |
| 2017/0094332 | A1* | 3/2017 | Thomas | H04N 21/2543 |

* cited by examiner

Primary Examiner — Jude Jean Gilles
(74) Attorney, Agent, or Firm — Haley Guiliano LLP

(57) ABSTRACT

Interactions between media devices and content distribution systems are enhanced by analyzing and/or optimizing the selection of which sources the media devices access for which content. Content consumption metrics are tracked for a user and/or device, such as which content items or channels are watched, amounts of time the channels or items are watched, which content items a user has expressed an interest in, and so forth. Subscription and/or license information may also be tracked. Content availability information is collected across, potentially, multiple content distribution systems, including information indicating what subscriptions or licenses are needed to view specific channels, services, or items of content from specific content distribution systems. Based on the content consumptions metrics, subscription information, and content availability information, various actions may be taken, such as displaying a subscription utilization report, suggesting alternative content consumption strategies, and so forth.

20 Claims, 8 Drawing Sheets

Additional Information — 400

Top TV channels consumed — 410

| Top TV channels consumed | |
|---|---|
| CBS | 4 Hrs |
| MSNBC | 3 Hrs |
| Fox | 3 Hrs |
| NBC | 3 Hrs |
| PBS | 3 Hrs |
| CBS | 4 Hrs |
| ... | |

Top Streaming Apps used — 420

| Top Streaming Apps used | |
|---|---|
| Amazon | 8 Hrs |
| Netflix | 8 Hrs |
| Hulu | 0 Hrs |

FIG. 4

Subscription Report Based on Activity over Last 30 Days

| Stations Watched | Current cable package | First alternative source | Second alternative source |
|---|---|---|---|
| NBC: 20% | Comcast, Digital Extended | Comcast Basic (Savings of $18/month) | OTA (Savings of $32/month) |
| CBS: 10% | Comcast, Digital Extended | Comcast Basic (Savings of $18/month) | OTA (Savings of $32/month) |
| CNN: 1% | Comcast, Digital Extended | Comcast Basic (Savings of $18/month) | OTA (Savings of $32/month) |
| CNBC: 69% | Comcast, Digital Extended | Comcast Basic (Savings of $18/month) | No Savings |

Recommendations:
- A lower cable lineup will meet your needs based on viewing behavior from last 30 days

FIG. 5

Subscription Report Based on Activity over Last 30 Days

| OTT Apps | Hrs consumed | State | Recommendation |
|---|---|---|---|
| Netflix | 28 hrs | Subscribed | None |
| Amazon | 2 hrs | Subscribed | None |
| Hulu | 0 hrs | Subscribed | Unsubscribe (savings of $9.95/month) |

FIG. 6

SUBSCRIPTION OPTIMIZER

TECHNICAL FIELD

Embodiments relate generally to distributing and accessing media content, and, more specifically, to techniques for tracking and optimizing interactions between media consumption devices and content distribution systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Media devices consume media content from a variety of different media sources. The number and variety of these sources is ever increasing. A content distribution system may provide one or more sources of media content. Content distribution systems include traditional broadcast, cable, or satellite television distribution systems, as well as Internet-based distribution systems for downloading or streaming content. While certain content distribution systems provide at least some free sources of content, usually supplemented by promotional materials, many content distribution systems require that client devices have a subscription or license to acquire some or all of the sources of the content that they distribute. This requirement impacts the interactions between the client devices and the content distribution systems, requiring a variety of technical operations such as credential exchange and authentication, access control look-ups, secure transactions, decryption and encryption of content and/or keys, and so forth, in order to ensure that client devices have the appropriate subscriptions or licenses.

As content distribution systems proliferate, and as the subscription-based and/or license-based distribution services those systems provide continue to evolve, the process of managing a media device's access to the content that the user, or users, of the device wish to view becomes increasingly complex. Moreover, the rules, restrictions, pricing models, content availability, and other characteristics of these subscription-based or license-based content sources are constantly changing, as the operators of the content distribution system experiment with their systems. These changes often end up both confusing consumers and having unintended effects on the efficacy of a content distribution system. Both the distribution and consumption of content is therefore often inefficient, based on an imperfect understanding of ever-shifting objectives.

BRIEF DESCRIPTION OF THE DRAWINGS

The present invention is illustrated by way of example, and not by way of limitation, in the figures of the accompanying drawings and in which like reference numerals refer to similar elements and in which:

FIG. 4 is a screenshot of an example graphical interface for reporting information about previous content consumption strategies;

FIG. 5 is a screenshot of an example graphical interface for comparing a current content consumption strategy to a number of alternative strategies;

FIG. 6 is a screenshot of an example graphical interface for reporting information about previous content consumption strategies and recommending changes for future content consumption;

DETAILED DESCRIPTION

Figure 1:
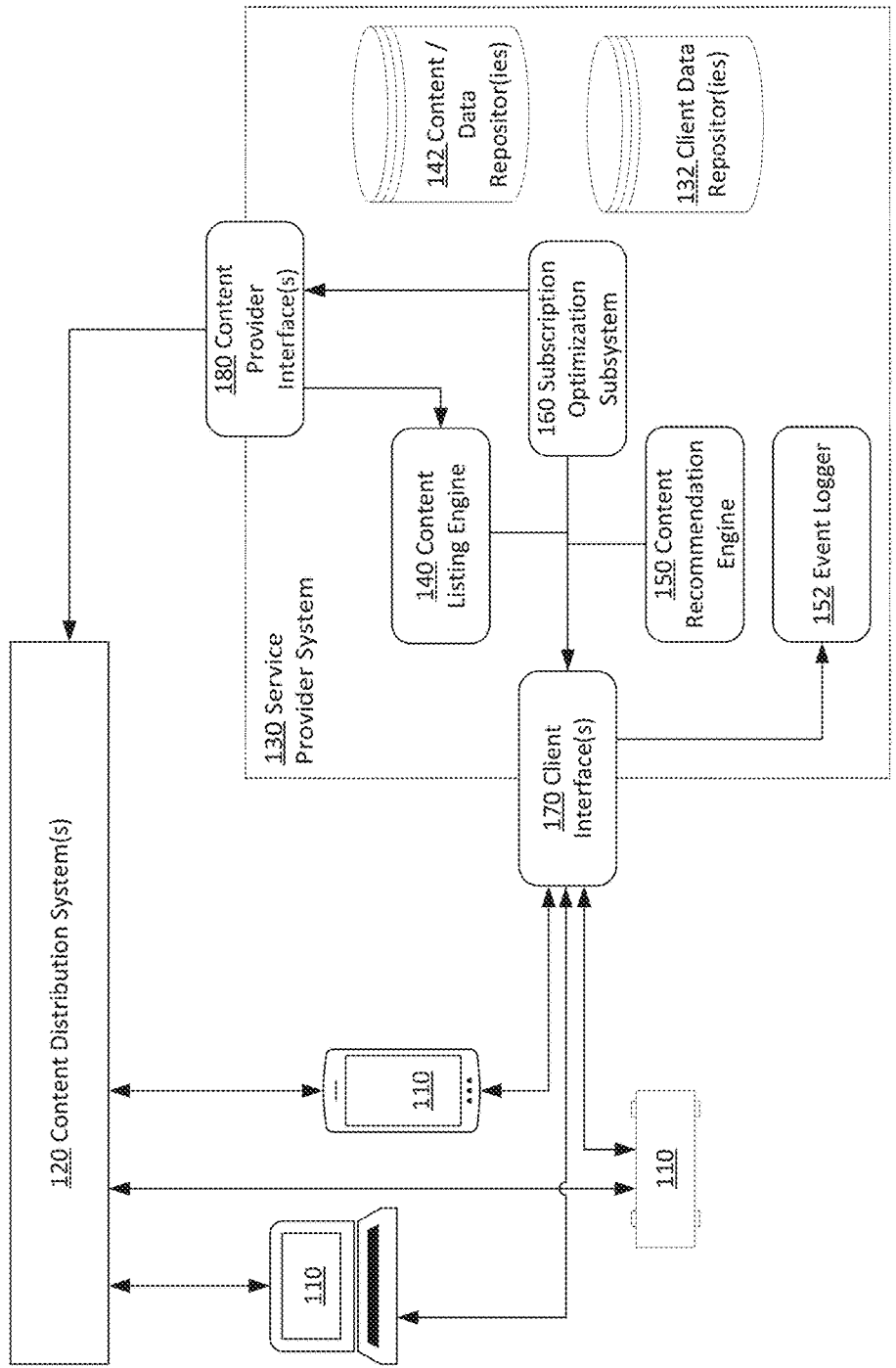
FIG. 1 is an illustrative view of various aspects of an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
    2.0. Structural Overview
    2.1. Client Devices
    2.2. Content Distribution Systems
    2.3. Service Provider
    2.4. Subscription Optimization Subsystem
    3.0. Example Subscription Optimization Interfaces
    4.0. Functional Overview
    5.0. Example Embodiments
    6.0. Implementation Mechanism—Hardware Overview
    7.0. Extensions and Alternatives

1.0. General Overview

Approaches, techniques, and mechanisms are disclosed for enhancing interactions between media devices and content distribution systems by analyzing and/or optimizing the selection of which sources the media devices access for which items of contents. Various content consumption metrics are tracked for a user and/or device, such as which content items or channels are watched, amounts of time the channels or items are watched, which content items a user has expressed an interest in (e.g. by scheduling the content item for recording or putting the content item on a watch list), and so forth. Subscription and/or license information, indicating subscriptions and/or licenses to which a user or device has access, may also be tracked. Meanwhile, content availability information is collected across potentially multiple content distribution systems for multiple sources of content, including information indicating what subscriptions or licenses are needed to view specific channels, services, or items of content from specific content distribution systems.

Based on the content consumptions metrics, subscription information, and content availability information, various actions may be taken at the media device, such as displaying a subscription utilization report, displaying a true cost of each watched content item or hour spent watching a channel, suggesting alternative content consumption strategies that may be less costly (e.g. eliminating certain subscriptions and/or acquiring others), automatically subscribing to or unsubscribing to certain subscription plans, automatically obtaining a license for certain content, and so forth. In this manner, the described systems and techniques enable a user's media device(s) to be more efficiently configured with respect to from which content distribution system(s), and via which subscription(s) or license(s) (if any), the media device(s) obtain content.

Moreover, media devices may be configured to communicate with a service provider system that, among other aspects, provides various services with respect to the foregoing data. The service provider system may, for instance, be a source of the content availability information, and even the various reports and suggestions. The service provider system may optionally expose various interfaces for the media devices to reconfigure their subscriptions with various content distribution systems. The service provider system may also aggregate content consumption information across multiple users and multiple devices. With this information, the service provider system may provide various services to the content distribution systems, such as identifying new subscription bundles that a content distribution system may wish to provide, either in general or to a targeted set of users.

In other aspects, the invention encompasses computer apparatuses and computer-readable media configured to carry out the foregoing techniques.

2.0. Structural Overview

FIG. 1 is an illustrative view of various aspects of an example system 100 in which the techniques described herein may be practiced, according to an embodiment. System 100 comprises one or more computing devices. These one or more computing devices comprise any combination of hardware and software configured to implement the various logical components described herein, including components 110-180. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

2.1. Client Devices

Client devices 110 are devices that are configured to receive and play media content items received over one or more communication mechanisms from one or more content distribution systems 120. Client devices 110 may be any of a wide variety of specialized or general purpose computing devices that permit users to access digital media content. Each client device 110 may be configured to receive and process digital content streams and/or files that represent media content items, such as, without limitation, digital videos, music, games, multimedia presentations, or virtual reality presentations. Each client device is further configured to play those media content items to one or more users via a display, speaker, and/or other suitable output device.

Client devices 110 may also be referred to as media consuming devices, or simply "media devices." Such devices may include, for instance, set top boxes such as digital video recorders (DVRs) or streaming receivers, "smart" televisions, smartphones and other personal handheld devices, gaming consoles, virtual or augmented reality displays, such as eyewear or headsets, personal computers, and so forth. A single client device 110 may be operated by one or more users to view media content items, and a single user may operate more than one client device 110. Although only three client devices 110 are depicted, it will be appreciated that there may be any number of client devices 110 and device types within system 100.

2.2. Content Distribution Systems

Client devices 110 provide users with access to one or more different content distribution systems 120 via which client devices 110 may obtain content. The content distribution systems 120 perform computing and communication operations on behalf of entities referred to herein as content distributors, and acts described herein as being performed by a content distributor should be understood as being performed by one or more computing devices and/or communication equipment within a content distribution system 120 configured by the content distributor to perform such acts. System 100 may include any number of content distribution systems 120.

Distribution Models

A content distribution system 120 may distribute contents via a variety of communication mechanisms, including, without limitation, broadcast television or radio (also referred to as over-the-air or "OTA"), satellite communications, dedicated cable lines, cellular networks, and/or wide-area networks such as the Internet. As used herein, the act of client device 110 obtaining content from a content distribution system 120 may thus include, without limitation, receiving broadcast or multicast streams over any of these communication mechanisms, on-demand streaming of content from an Internet or cable source, recording such streams (with or without such a recording being scheduled in advance), downloading media files containing content from Internet sources, or any other act of receiving and/or recording media content.

Content distribution systems 120 provide client devices 110 with access to media content using various types of sources. These sources are characterized by different distribution models. One such model is a "free" model, in which a client device 110 is able to access content from a source without any corresponding account having been charged a fee for the content. Promotional materials are typically included in or inserted into free content prior to viewing. Free OTA broadcast television stations are a particularly common example of sources of such free content, though free content may also or instead be provided by any content distribution system using any communication mechanism.

Another distribution model is a pay-per-view model, in which a client device 110 may only access a specific item of content from a source when an account associated with the content is also associated with a valid license from the source to view the specific item. Such a license is typically acquired via an implicit or explicit purchase transaction conducted between the media device (or another device associated with the account) and the content distribution system. A license is often specific to the distribution system that is distributing the content, and may be time-expiring (i.e. the content is being rented), permanent (i.e. the content is being purchased), or subject to other restrictions. Examples of content distributed in accordance to such models are pay-per-view cable broadcasts, pay-per-view movies, time-expiring or limited-use downloads of media files, non-time-expiring purchased content within an online digital media store, and so forth.

Another distribution model is a subscription model, in which a client device 110 is permitted access to a group of content items from a source for a certain period of time referred to as a subscription period. The group may be pre-defined, or open-ended such that the group may change during the subscription period. A content distribution system 120 typically grants a subscription to a group of content in exchange for an associated subscription fee that is charged to an account associated with the client device 110. Often, a subscription entitles the client device 110 to access any number of items from the group within the subscription period, and the account is charged even if no content is accessed during the subscription period. However, other subscriptions may limit the number of items that may be accessed, or be associated with other access restrictions. A content distribution system 120 may offer different subscriptions (also referred to subscription plans or tiers) for different groups of content, for subscription periods of different lengths, and/or having different access restrictions.

For pay-per-view and subscription models, a client device 110 is typically associated with one or more accounts via which the client device 110 obtains access to the subscribed or licensed content. Such an account may furthermore be tied to a user, who in the process of providing various user and/or device credentials, associates one or more of his or her client devices 110 with the account. Each content distribution system 120 may have its own account, or account credentials and other account information may be shared across two or more of the content distribution systems 120. For at least some content distribution system 120, a single account may be associated with multiple devices at the same time, thereby allowing a user associated with the account to access content from the content distribution system 120 using a variety of client devices 110.

A content distribution system 120 may be configured to only send certain information necessary for a client device 110 to play pay-per-view or subscription-based content when the content distribution system 120 can locate a record within a suitable data repository that associates the media device (or an associated account) with a valid subscription or license for the content. For instance, when no such record exists for a client device 110 that attempts to watch pay-per-view or subscription-based content, the content distribution system 120 may simply decline to send the content to the client device 110, or at least decline to send a decryption key, authorization token, or other information that the client device 110 requires before playing the content.

Meanwhile, a content distribution system 120 typically includes or is coupled to a payment system by which users may request subscriptions or licenses, pay subscription or license fees charged to their account(s), or obtain advance credit for such fees. A content distribution system 120 may include interfaces for interacting with the payment system. Such interfaces may include web interfaces, APIs, and/or custom interfaces configured for display at a particular type of client device 110.

As a consequence of the pay-per-view and subscription models, the act of a client device 110 obtaining content may further involve, depending on the embodiment, various supporting activities such as, without limitation: authenticating the client device 110 to the content distribution system 120, validating account credentials supplied by a user of the client device 110, verifying that a subscription or license is associated with the client device 110 and/or the relevant account, conducting a transaction to obtain a subscription or license if needed (either automatically based on previously supplied user financial information and permissions, or by interfacing with the user to request permission and/or financial information for such a transaction), sending various keys or tokens by the content distribution system 120 to the client device 110, and/or decrypting content at the client device 110 using such keys or tokens.

Channels and Portals

A content distribution system 120 may provide linear access to content via one or more channels, such as broadcast channels, cable channels, or video streams, that linearly play specific items of content at specific times. Historically, content to which client devices 110 have been provided linear access has been watched by multiple content devices 110 at the same time, as the content is playing on the channel, and without rewinding or fast-forwarding, on account of both the set times at which the content is transmitted, as well as the fact that the content is often transmitted at a rate that matches (or approximately matches) the rate at which the content is intended to be played. However, certain types of client devices 110, such as DVRs, may optionally record (or instruct another device to record) content from linear access channels to storage accessible by the client devices 110 for viewing at a future time. Such storage may be local, or cloud-based, and the recording client device 110 may or may not make such recordings available to other client devices 110 (e.g. other client devices that are associated with a same user account). Each source of content provided by a content distribution system 120 may include one or more channels. For instance, a subscription package comprising a single premium channel may be one source of content, while a subscription package offering a bundle of channels may be another source of content.

Content distribution systems 120 with channel-based distribution mechanisms may publish schedule data (e.g. an Electronic Program Guide or "EPG") indicating when specific items of content (also referred to as "programs") will be played, or "air." Some client devices 120 may utilize such schedule data to determine and/or track what specific items of content are airing on a channel being watched at the client device 120, determine what items of content will be available in a future period of time covered by the schedule data, determine when to automatically record an item of content that a user has expressed interest in or that is recommended for the user, and so forth.

A content distribution system 120 may also or instead provide access to content using one or more portal services. Each portal may serve as one or more sources of content, depending on the number of subscription tiers that are available for the portal. Such portals may include web sites, application interfaces, application programming interfaces, search engines, and so forth. Using navigation input at a client device 110, or at another device that interfaces with the client device 110, a user may browse through catalogs, hierarchical menus of content, or other types of content listings to locate content of interest to the user. The user may then select a specific item of content, thereby causing the client device 110 to request and receive the item of content from the associated content distribution system 120. Similarly, a user may request and receive content using search input and search results at search interfaces provided by certain content distribution systems 120.

Certain sources may be hybrid sources, in that they include both channel-based content and portal-based content. For instance, a cable provider may offer subscription packages that include both access to content from a set of channels and one or more Internet-based streaming services.

2.3. Service Provider

System 100 further comprises a service provider system 130. The service provider system 130 performs computing and communication operations on behalf of an entity referred to herein as a service provider, and acts described herein as being performed by a service provider should be understand as being performed by one or more computing devices and/or communication equipment within service provider system 130, configured by the service provider to perform such acts.

Service provider system 130 is configured to provide various services to client devices 110 via communications over one more networks, such as the Internet. To this end, client devices 110 are coupled to service provider system 130 via one or more communication interfaces 170, which may be web interfaces, application programming interfaces, and/or other suitable interfaces. In an embodiment, some or all of client devices 110 may furthermore execute application program, operating system, and/or firmware logic provided by the service provider system 120 for navigating EPG data and/or content listings, obtaining content from content distribution systems 120, viewing that content, and/or performing other media consumption tasks.

Content Listings

In an embodiment, service provider system 130 includes a content listing engine that sends to client devices 110 various listings, schedule data, and/or other metadata describing content available in one or more of the content distribution systems. Metadata may include titles, actors, genres, categories, descriptions, directors, release date, thumbnails, reviews, and so forth. Such data may be stored at the service provider system in one or more content data repositories. Service provider system 130 may collect this information directly from the one or more of the content distribution systems 120 for which it provides the metadata (e.g. via downloading the information from a content provider system 120 over a network, receiving an upload of the information via a content provider interface 180, etc.). Service provider system 130 may alternatively obtain some or all of the information from other providers, such as metadata aggregation services.

Content listing engine 140 may generate and provide a client device 110 with specific content listing interfaces for display at the client device 110, or, depending on the embodiment, client type, content type, and/or other factors, a client device 110 may generate its own content listing interfaces based on data received from content listing engine 140. In an embodiment, the content listing engine 140 or client device 110 may include listing aggregation logic configured to access multiple content listings from multiple content distribution systems. The aggregation logic may then aggregate the content listings into a single content listing, and generate an aggregated interface for display by the media device, which lists content and/or allows for searching of content available across multiple content distribution systems.

In an embodiment, a same item of content may be available via multiple different content distribution systems 120 and/or pricing models. For example, a movie might be scheduled for airing next week via a certain OTA channel, but also be available via a certain subscription, or for purchase via a pay-per-view model. A content item that is available from multiple sources may have only a single listing in the aggregated listing, but nonetheless indicate which sources provide access to the content item. When a user selects an item of content from the aggregated listing, the client device 110 identifies the content distribution system(s) that provide access to the content, and either automatically obtains (e.g. streams, downloads, purchases, records, schedules for recording, etc.) the content from a preferred content distribution system 120, or requests that the user identify the content distribution system 120 from which the content should be obtained. The media device may optionally prompt the user to take steps to obtain a license or subscription to the preferred or identified content distribution system 120, if needed.

In an embodiment, the content sources to which a user has subscribed, or potentially even the individual content items that a user has previously licensed, are communicated to the aggregation logic, which may then filter the aggregated listing to only show content items and/or content distribution systems 120 to which the user has access (i.e. a subscription or license). In an embodiment, an aggregated content listing may include listings for items to which a client device 110 does not currently have access, but in which a user may express interest (e.g. by bookmarking, commenting on, generating a "wish list" for, etc.). The client device 110 may optionally be configured to automatically retrieve the content when the content becomes available from a source to which the client device 110 has a subscription or license, or at least configured to notify a user of the availability of the content from a new source.

Content Recommendation

According to an embodiment, service provider system 130 includes a content recommendation engine 150. The content recommendation engine 150 identifies content items which may be of interest to a user, by applying various machine learning and recommendation algorithms to information in content data repository(ies) 142 and client data repository(ies) 132. Some or all of the identified content items may be sent as recommendation data to client devices 110. Client devices 110 may automatically obtain some or all of these recommended content items, or information about these content items may be shown in prominent manner to users in various recommendation interfaces or content listing interfaces.

Based on the data within content data repository(ies) 142 and/or client data repository(ies) 132, content recommendation engine 150 may provide general recommendation data to client devices 110. For instance, content recommendation engine 150 may provide a client device 110 with data indicating that a first content item is popular with viewers of a second content item, or that a first content item is a popular content item within a certain genre of content. The recommendation data may further include a weight or strength of the recommendation. Based on such general recommendation data, a client device 110 may itself make a decision as to when and whether to show recommendations. For instance, a client device 110 may be configured to recommend a first item of content whenever a client device 110 is playing or showing information about a second item of content that the recommendation data indicates is associated with the first item of content. In an embodiment, client device 110 may send a request to content recommendation engine 150 to identify a recommended item of content to show under a certain context (e.g. in a certain menu, or with a certain program), and content recommendation engine 150 may return a recommended item for that context.

In an embodiment, content recommendation engine 150 may further include client-specific or account-specific recommendations. For instance, rather than simply indicating that there is a general association between two items of content, the content recommendation engine may utilize data indicating events that have been logged with respect to a client device 110 and/or an account associated therewith to execute more advanced recommendation algorithms that produce personalized recommendations for the client device 110. Any suitable recommendation algorithm may be utilized. Note that, for such purposes, each client device 110 that utilizes service provider system 130 may be associated with a service provider account registered with the service provider system 130 and recorded in a client data repository 132. Multiple client devices 110 may be associated with the same service provider account and/or a single client device 110 may be associated with multiple service provider accounts.

Content recommendation engine 150 may provide a client device 110 with personalized recommendations in a variety of forms, including a list of personalized recommendations, a ranked list of personalized recommendations with optional recommendation scores, a personalized recommendation for one or more specific contexts, and so forth. In an embodiment, client device 110 may automatically record or otherwise obtain some or all of the content recommended to the client device 110, regardless of whether the content is generally recommended or recommended via a personalized recommendation.

To this and other ends, service provider system 130 may further include an event logger 152 configured to receive event data from clients 110. Some or all of client devices 110 may send data describing various events that have occurred, such as a client device 110 playing a certain item of content or channel, a client device 110 receiving input indicating an interest in certain content items, a client device 110 scheduling a recording of a content item, and so forth. Event logger 152 may additionally receive information related to each event, such as the identity of the client device 110, a service provider account identifier for an account with respect to which the event occurred, a time of the event, and so forth. Event data may be received for each individual event at a device 110, either as the event occurs, or in batches sent on a periodic or other basis. Event data may instead be received in an aggregated form. Event logger may store this event data within one or more client repositories 132. The data may be stored as individual events, or aggregated data (e.g. data simply indicating how often a content item was viewed, or how often two different items of content were viewed by a same device or in association with a certain user account, without necessarily describing each event, or indicating the client device 110 or user account involved in such an event).

Miscellaneous

In an embodiment, service provider system 130 may furthermore include a subscription optimization subsystem 160, which is subsequently described in more detail with respect to FIG. 2. Service provider system 130 may also provide a number of other services through other components not described herein. Depending on the embodiment, service provider system 130 may or may not be a content distribution system 120.

System 100 illustrates only one of many possible arrangements of components configured to provide the functionality described herein. Other arrangements may include fewer, additional, or different components, and the division of work between the components may vary depending on the arrangement. For example, in some embodiments, each media device 110 may include its own subscription optimization subsystem 160, content recommendation engine 150, and/or content listing aggregator 140, meaning that such a component need not necessarily be included in service provider system 130. In fact, in some embodiments, service provider system 130 may be omitted. In an embodiment, one or more content distribution systems 120 may provide their own subscription optimization subsystem 160 or content recommendation engine 150.

2.4. Subscription Optimization Subsystem

Figure 2:
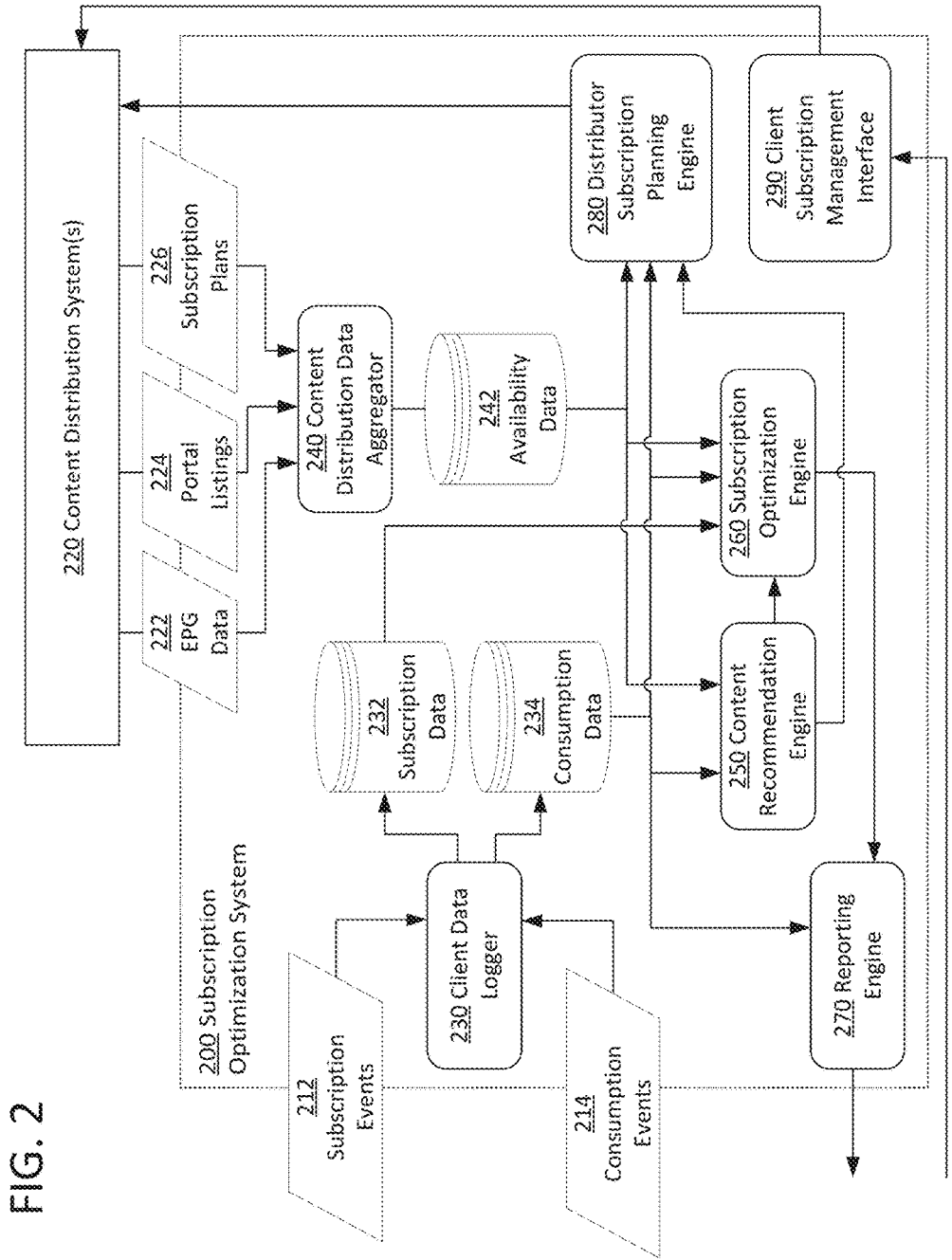
FIG. 2 is an illustrative view of various aspects of an example subscription optimization system in which the techniques described herein may be practiced.

FIG. 2 is an illustrative view of various aspects of an example subscription optimization system 200 in which the techniques described herein may be practiced, according to an embodiment. System 200 comprises one or more computing devices. These one or more computing devices comprise any combination of hardware and software configured to implement the various logical components described herein, including components 230-290. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

System 200 provides subscription optimization services to client devices, such as client devices 110. System 200 may be part of a service provider system, such as system 130, and in fact is illustrated as subsystem 160 of service provider system 130 in the embodiment depicted in FIG. 1. However, subscription optimization system 200 may in other embodiments be implemented fully at the client device to which it provides services, even if such embodiments also include a service provider. In yet other embodiments, subscription optimization system 200 may be implemented partially at the client device by application program logic working in concert with components located at a service provider system. In yet other embodiments, some or all of the subscription optimization system 200 may be implemented by a content distribution system, such as content distribution system 120, or a system operated by yet another entity.

Data Logger

Subscription optimization system 200 includes a client data logger 230, similar to event logger 152, that is configured to receive data describing various events and/or other information about one or more client devices. The data is received from one or more reporting subsystems executing on the one or more client devices and/or the one or more content distribution systems 220. A reporting subsystem may be program logic that is, for example, installed on a client as part of system 200, installed as part of an application used for receiving services from a service provider or content distributor, or embedded within the operating system of the client device.

The reported data may describe consumption events 214 that indicate various information about content that has been viewed at a client device, or in which a user of the client device may have indicated an interest. Consumption events 214 may describe a wide variety of events. For instance, a consumption event 214 may be generated whenever a content item is played at the client device. Such a consumption event 214 may optionally indicate a variety of other information, such as how much of the content item was actually watched. A consumption event 214 may also be generated whenever a client device has been instructed to record a content item. Another consumption event 214 may be generated whenever a user has bookmarked, created a wish list for, or otherwise marked a content item as being of explicit interest to the user. Another consumption event 214 may be generated whenever a user has implicitly expressed an interest in a content item, such as by requesting to view information about the content item. Another consumption event 214 may be generated whenever a viewer watches a certain channel or accesses a certain content portal. Such an event 214 may indicate for how long the channel or portal was accessed. A variety of other events 214 may likewise be generated.

Of course, different embodiments may include any combination of the foregoing consumption events 214. Client data logger 230 may record some or all of the received events 214 in consumption data 234, which may be stored in any suitable data repository, including a repository 132 of system 130. Consumption events 214 may be logged individually, or client data logger 230 may be configured to generate aggregate consumption data based on individual events 214. Different types of consumption events 214 may have different implications, and hence the client data logger 230 may record the type of each consumption event 214.

In an embodiment, a client device may be unable to record certain types of events for certain content distribution systems. For instance, a client device may rely upon a proprietary third-party application to access a certain content distribution system 120. Such applications may announce information about the currently playing content item to the operating system and/or reporting subsystem of the client device, or at least expose an API by which the reporting subsystem may obtain such information. However, in an embodiment, some proprietary applications do not announce such information or expose an API for retrieving such information. Instead, an event 214 may simply indicate for how long the application was used. If any additional information is exposed, such as a specific channel that was accessed or a category of content that was accessed, such additional information may also be recorded. In an embodiment, a content distribution system may not publish a schedule of content currently showing on a certain channel. In such circumstances, it may still be useful to generate events 214 that indicate for how long the channel was watched.

The reported data may furthermore include subscription events 212. Subscription events indicate one or more subscriptions or licenses that are associated with the client device. The client device may report subscription events as they occur (e.g. when a user purchases a subscription or enters subscription-related credentials), or the client device may on occasions provide a current list of subscriptions and/or licenses associated with the client device. The client device may also attempt to verify that a subscription is still valid after a certain period of time (e.g. on a monthly basis). A client device may be configured to determine some or all of its associated subscriptions based on current configuration information (e.g. the content distribution systems that the client device has been configured to interact with). A client device may also or instead be configured to identify active subscriptions and/or licenses implicitly, based on what content items, channels, or applications are actually played at the client device. Alternatively, subscription events 212 may be provided by content distributors and/or other client devices associated with one or more of the same user accounts.

Based on subscription events 212, client data logger 230 records subscription data 232 for a client device, indicating what subscriptions and/or licenses are believed to be active for a client device. In an embodiment, subscription data may also indicate other subscriptions, licenses, and/or free content that a client device is believed to be eligible to receive based on information about the client device, such as content distribution systems previously accessed by the client device, a geographic area associated with the client device, the type of client device, user account(s) associated with the client device, and so forth.

Content Availability Data

System 200 is further configured to receive a variety of information about one or more content distribution systems 220. This information is collectively referred to herein as distributor data. Content distribution systems 220 may be, for example, content distribution systems 120. Content distribution systems 220 provide content to the client device(s) to which system 200 provides services using free, pay-per-view, and/or subscription-based sources.

The information received about a particular content distribution system 220 may include, for example, EPG data 222 and/or portal listings 224, indicating what content is currently available via the content distribution system. EPG data 222 and portal listings 224 may be received in a variety of manners, including periodic downloads or uploads of content inventories, "crawling" of websites containing such data, interaction with APIs by which such data may be retrieved or received, and so forth. EPG data 222 and portal listings 224 may be obtained directly from a content distribution system 220, and/or from third-party provider(s) of such information.

The information received about a particular content distribution system 220 further includes subscription plan data 226. Subscription plan data 226 describes one or more subscription plans that are currently available from a content distributor, including terms such as prices, restrictions, subscription periods, promotions, and so forth. In some cases, subscription plans 226 may indicate which content items described EPG data 222 or portal listings 224 for the content distribution system 220 are available via each subscription plan, or a set of channels to which each subscription plan provides access. Such information may alternatively be included directly in EPG data 222 or portal listings 224. Subscription plan data 226 may be provided using any suitable means, either directly from content distribution system(s) 220, or via other sources.

A distributor data aggregator 240 in system 200 takes as input the various EPG data 222, portal listings 224, and subscription plans 226, and compiles the information to form availability data 242. Generally, availability data 242 indicates which specific content items or channels are available via which specific sources, as well as the costs associated with each of the specific sources. For example, availability data 242 may indicate that a first content item is available via for free on a first portal, for a license fee of $4.50 on another portal, and as part of a $9.99 monthly subscription on another portal. Availability data 242 might also indicate that the first content item is scheduled for broadcast on a particular channel, which is free via a first service, or also available as part of a $49.99 subscription with another service. As another example, availability data 242 may also indicate that a first channel is provided as part of a $9.99 subscription from a cable provider, a $29.99 subscription from the same cable provider, and as part of a $14.99 subscription from a streaming source. In some embodiments, availability data 242 includes both channel availability data and content item availability data. In other embodiments, availability data 242 includes either channel availability data or content item availability data, but not both.

Note that availability data 242 may be useful for providing content listings, and hence distributor data aggregator 240 may be a component that is in certain respects similar to or the same as content listing engine 140.

Reporting Engine

System 200 further comprises a reporting engine 250. Among other aspects, reporting engine 270 analyzes content consumption data 234 and generates, based thereon, one or more reports comprising an analysis of the content consumed by a client device, or by a group of client devices associated with a same user account (e.g. a service provider account). Such a report may show a wide variety of information, depending on the embodiment. For instance, the report may indicate how much time a user spent watching a certain channel, group of channels, genre, or category of content. The report may also or instead indicate how much time a user spent watching content from a certain application or portal.

In an embodiment, reporting engine 270 may further be configured to access availability data 242. By comparing content consumption data 234 to availability data 242, reporting engine 270 may generate a variety of additional information to include in the one or more reports. Such information may include, for instance, how much time in aggregate was spent viewing content items from a certain subscription plan or service, the average cost per hour or item watched for a given subscription plan or service, a break-down of that cost by genre or category of content, how many of the content items or channels (and/or hours spent watching those content items or channels) would have been available via one or more different subscription plans or licensing services, what the cost of those different subscription plan(s) or licensing service(s) would have been (in aggregate, per-item, or per-hour) had they been used instead, what content items or channels watched at the client device would not have been available via the different subscription plans or licensing services, and so forth.

The reporting engine 270 may further include in the analysis content items scheduled to be watched or recorded. For instance, a report may indicate how many items the client device has scheduled to be recorded via channels offered from a certain subscription package in the next month. The reporting engine 270 may further include content items in which a client device has indicated an explicit interest, such as a wish list or bookmark. For instance, if a user has expressed an interest in a first content item, and the first content item will be available in a next period of time (e.g. the next month) via a certain source, the report may indicate this information. A report may likewise indicate items of implicit interest.

In an embodiment, system 200 may further include a content recommendation engine 250, which may be similar to or the same as content recommendation engine 150. Recommendations from such an engine may be treated as items or channels of predicted interest, corresponding to predicted consumption events for some future time period. The reports may indicate which items or how many items of predicted interest are going to be available via a particular source in an upcoming period of time. For instance, if a user has previously watched a significant number of baseball games for a certain team, the report may indicate that a certain subscription plan will have a certain number of baseball games for the team within the next month. Or, if a user has previously watched a high number of movies with a certain actress, director, or subject matter, the report may indicate how many upcoming movies available via a certain source will have that actress, director, and/or subject matter.

Showing which previously viewed items or channels are available via which sources, and/or which upcoming scheduled items, items of explicit or implicit interest, or recommendations are going to be available via a source in the near future, may be particularly useful if the user is not subscribed to the source, or if the user is thinking of dropping a subscription to the source. The report may indicate such items either by specifically showing each of the items associated with a source, or simply by showing a graph or number of items, in some or all of these categories, that are associated with source.

Reporting engine 270 may deliver reports in a variety of forms, depending on the embodiment. Reporting engine 270 may, for instance, send instructions to a client device for displaying an interface that displays the report, or send structured data based upon which the client device may build the interface itself. If reporting engine 270 is part of the client device, reporting engine 250 may directly build and display reports. In an embodiment, reports may be delivered via web interfaces or application interfaces to client devices other than the client device(s) for which the report was generated.

The displayed report may include tables, charts, graphs, or any other data visualizations, along with interface controls for manipulating the visualization or drilling down into more detailed data. In an embodiment, the displayed report may include controls for filtering the displayed data to only show information about certain types or categories of content, certain time periods, or certain channels or content distribution systems. In an embodiment, free sources may be combined together for certain reports. For example, instead of indicating on which free station or portal an item is available, the report may simply indicate that the item is available for free.

Client Content Consumption Strategies

According to an embodiment, system 200 further comprises a subscription optimization engine 260. Subscription optimization engine 260 may analyze the availability data against the content consumption data, and optionally predicted items of interest from the recommendation engine 250, to identify one or more alternative content consumption strategies for a client device. In one aspect, a content consumption strategy describes the content distribution systems, and sources thereon, that a client device is configured to interact with for obtaining content. A strategy indicates, for example, which groups of content or channels the client device (or associated user account(s)) should obtain via subscription-based sources, and/or which content items or channels the client device should access from pay-per-view sources. The strategy may further rely on a number of free sources for obtaining certain content items or channels.

For each content consumption strategy, subscription optimization engine 260 may identify a total cost. Subscription optimization engine 260 may furthermore generate one or more scores, using one or more scoring functions, for each content consumption strategy. A scoring function may consider any of a variety of factors, depending on the embodiment, including not only total cost of a strategy, but also which content items and channels will be available under each strategy.

With respect to the latter factor, a strategy scoring function may consider more specifically factors such as, without limitation, which channels, portals, genres, and/or series that the client device(s) regularly accesses will still be accessible under the strategy, which scheduled items will be accessible under the strategy, which of the scheduled items are from series or genres that the user records but does not end up watching, which items of explicit interest will be accessible under the strategy, which items of explicit interest will be accessible under the strategy, which items of predicted interest (e.g. recommendations) will be accessible under the strategy, whether the strategy permits access to certain formats of content (e.g. HD, 3D, 4K, HDR, etc.) that the client device is regularly used to play or that a user associated with the client device has indicated as being preferred, and so forth.

Each of the various item types and channels may be associated with different weights, such that, for example, omission of a scheduled item may affect the score more than omission of a bookmarked item, which affects the score more than omission of an item of implicit interest. Weights may vary depending on the embodiment, or even for different content items. For example, the inclusion or omission of a content item may be weighted in accordance what percentage of a client device's total content consumption (in hours, numbers of items, number of channels, etc.) is spent (or predicted to be spent) consuming the item or channel. Or, the weight of an item may be increased if consumption trends indicate that it belongs to a category of items that, though watched for a relatively small amount of time in aggregate, is nonetheless regularly consumed, such as a news or weather program, or a particular television series. In an embodiment, an item's priority on a prioritized list of scheduled recordings and/or bookmarked content may be utilized to adjust the weight associated with the item.

According to an embodiment, reporting engine 270 may be configured to include information related to some or all of the identified strategies in one or more reports. For instance, reporting engine 270 may compare the price of a client device's current strategy, as indicated by subscription data 232, to one or more other strategies. In an embodiment, each of the strategies may be ranked by the one or more strategy scores, and recommendations pertaining to the highest ranked strategies may be shown in a report. Reporting engine 270 may further show specific information about each strategy, including strategy scores, and/or specific subscription, channels, or content items included (or not included) in the strategy. Moreover, reporting engine 270 may calculate and show various metrics with respect to each strategy, such as the average cost of the strategy for each item that the client device accessed or each hour of content played by the client device, in one or more previous periods, the average cost of each hour or item that the client device is predicted to access in an upcoming period of time, an incremental cost of a specific item of content or specific channel that a strategy includes relative to another strategy that omits the specific item of content or specific channel, and so forth.

In an embodiment, a user may specify certain attributes for a strategy, such as specific channels, subscriptions, or content items desired. Reporting engine 270 may identify strategies that match the specified attributes, and provide information about those strategies.

In an embodiment, instead of, or in addition to, showing information about a specific strategy, a report may include information indicating one or more recommended changes to the subscriptions that client device is associated with. The changes, if made, would result in the client device adopting a particular strategy identified by the subscription optimization engine 260. For instance, a recommendation may be to drop a first subscription package from a cable provider, add a lower-priced subscription package, and add a streaming video service. The report may further indicate a cost savings associated with the recommendation. The report may furthermore indicate any content to which the client device will gain access or lose access as a result of the change. In an embodiment, a user may select a control associated with a specific channel or content item that will be gained or lost to indicate that the specific channel or content item is unimportant to the user. The subscription optimization engine 260 may then recalculate the scores for the strategies without consideration of the specific channel of content item, and present alternative recommendations that reflect the new scores.

In an embodiment, a report may further include an interface control that allows a user of the client device to instruct the client device or system 200 to take one or more steps to implement the change. For example, a content distribution system 220 may provide a web interface or application interface where a user may modify his or her account to effect a change. Clicking on the control may launch the web interface or application interface for the user. Or, the content distribution system 220 may include an API by which a client device or client subscription management interface 290 of system 200 may request such a change without requiring additional user interaction.

In an embodiment, subscription optimization engine 260 may make some changes to adopt a content consumption strategy without necessarily first presenting information about the strategy or changes to a client device. For instance, subscription optimization engine 260 may automatically adopt a highly ranked content consumption strategy if the relevant content distribution systems 200 include interfaces by which client subscription management interface 290 may subscribe to or unsubscribe from services on behalf of a client device. In an embodiment, before doing so, subscription optimization engine 260 may first check to see whether data exists that indicates that the subscription optimization engine 260 has user pre-approval to make such changes.

Distributor Subscription Planning Engine

According to an embodiment, system 200 comprises a distributor subscription planning engine 280. Distributor subscription planning engine 280 is configured to access content consumption data 234 and subscription data 232 to identify recommended subscription packages for content distribution systems 220 to offer in the future. For instance, distributor subscription planning engine 280 may identify content items that are in high demand, such as certain premium TV channels, programs, series, seasons of series, sports, special events, and so forth, and suggest that a content distribution system offer a special subscription based on the content.

Distributor subscription planning engine 280 may send messages indicating such recommendations to a content distributor, or a content distributor may log-in to the distributor subscription planning engine 280 to access or view such recommendations. In an embodiment, distributor subscription planning engine 280 may include a tool whereby a content distributor may "test" various subscription packages or content offerings. The tool may utilize content consumption data 234, availability data 242, and/or predictions from recommendation engine 250 to predict how many users will subscribe to the package, and what impact the package will have on other subscriptions already available from the content distributor.

According to an embodiment, distributor subscription planning engine 280 may include an interface by which a content distributor may upload information about a special promotion that is offered to client devices. The special promotion may be considered in content consumption strategies generated by subscription optimization engine 260. Moreover, the content distributor may utilize the aforementioned tool to test the impact of the promotion before offering the promotion.

In an embodiment, distributor subscription planning engine 280 may further interact with client devices to request feedback regarding one or more subscription plans. For instance, distributor subscription planning engine 280 may identify a subset of client devices that watch or express an interest in a certain series of content more frequently than other client devices. Distributor planning engine 280 may send messages to that subset of client devices, or users thereof, asking whether they would be interested in a subscription package that featured the series of content and potentially other related content items. The message might further prompt the users to indicate a price point that would be acceptable for the package. The distributor subscription planning engine 280 may aggregate any collected data and send a proposal to one or more content distribution systems 220 to offer such a package.

Miscellaneous

System 200 illustrates only one of many possible arrangements of components configured to provide the functionality described herein. Other arrangements may include fewer, additional, or different components, and the division of work between the components may vary depending on the arrangement. For example, content recommendation engine 250, subscription optimization engine 260, distributor subscription planning engine 280, and/or client subscription management interface 290 may be omitted. Moreover, certain types of data may be omitted. For example, client subscription data 232 and subscription events 212 may not be necessary in certain embodiments, where only consumption is being reported, or where suggestions are made solely based on consumption rather than knowledge of the subscriptions and licenses already associated with a device. Also, EPG data 222 or portal listings 224 may not be necessary in certain embodiments.

3.0. Example Subscription Optimization Interfaces

Example interfaces that may be presented in the course of practicing the described techniques are now described. Such interfaces may be generated and presented, for example, by a reporting engine 270 or a similar component. Where reporting engine 270 is outside of a client device, reporting engine 270 may simply send the embedded information to a client device, which then generates the depicted interfaces. Or, reporting engine 270 may generate a web interface that is sent to a client device, which may be the same as or different from the client device whose consumption statistics are being reported. The illustrated information in the example interfaces may pertain to content consumption observed for a single client device, or for a group of client devices tied to a same account (e.g. a same service provider account).

Figure 3:
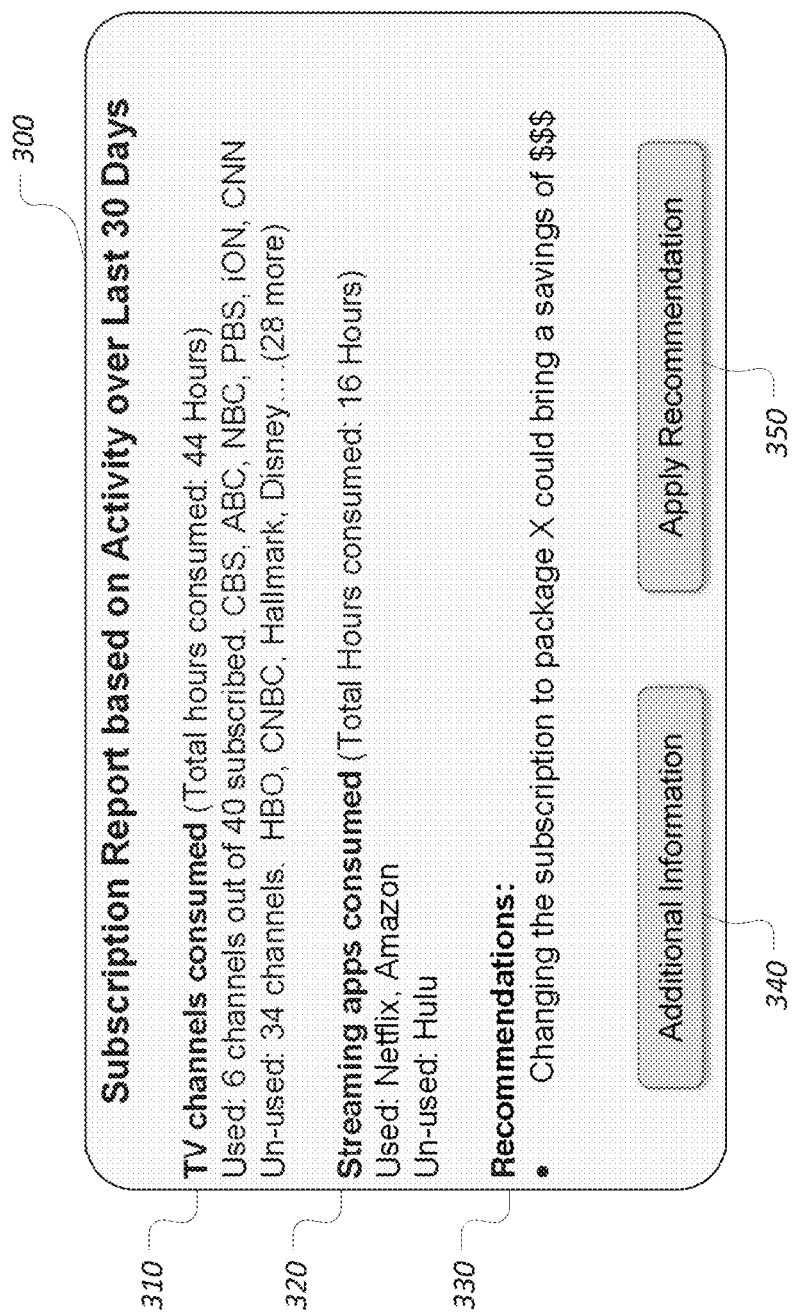
FIG. 3 is a screenshot of an example graphical interface for reporting information about previous content consumption strategies, and recommending changes for future content consumption.

FIG. 3 is a screenshot of an example graphical interface 300 for reporting information about previous content consumption strategies, and recommending changes for future content consumption, according to an embodiment. Interface 300 comprises a first section 310 with consumption information for television channels. Section 310 includes information such as the total number of hours of television content consumed (e.g. time spent watching OTA or cable channels), how many television channels were watched, which television channels were watched, the total number of television channels accessible, and which of those television channels were not watched. In the illustrated embodiment, since there are many un-used channels, the un-used channels have been sorted according to some criteria (e.g. popularity, subscription cost, incremental cost of a current subscription over another subscription that does not include the un-used channel, etc.). Only the highest ranked channels have been listed, though a complete list may be obtainable via a link associated with the word "more." A similar technique may be used to abbreviate the list of used channels.

Interface 300 further comprises a second section 320 with consumption information for streaming services. Section 320 includes information such as the total number of hours of streaming content consumed, which streaming services were used, and which streaming services were not used. If the number of streaming services is large, the streaming services may be ranked in similar manner to the un-used channels, with only the highest ranked services displayed.

Interface 300 further comprises a third section 330 comprising one or more recommendations to change the one or more subscriptions associated with the client device. Interface 300 further comprises an interface control 350 to apply the recommendation. Selection of control 350 may cause, for instance, the client device to launch another interface whereby a user may change his or her subscription(s). Or, selection of control 350 may cause the client device, service provider system, and/or content distribution system to take various steps to make the recommended change without further user input. In an embodiment, if the content distribution system does not include a necessary API that would allow the client device or service provider system to make the recommended change, and does not provide a graphical interface displayable at the client device through which a user may request such a change, control 350 may be omitted.

Interface 300 further includes an interface control 340 for requesting additional information about the consumption activities reported in interface 300. Selection of interface control 340 may, for example, launch one of the following interfaces, or any other suitable interface.

FIG. 4 is a screenshot of an example graphical interface 400 for reporting information about previous content consumption strategies, according to an embodiment. Interface 400 comprises a section 410, which depicts a table of individual television channels and hours spent watching each individual channel, as well as a section 420, which depicts a table of individual streaming services and hours spent watching each individual streaming service. In an embodiment, one or both of the tables may be a scrolling table, so as to allow a user to see information about all channels for which there is information. In an embodiment, the channels or services may be ranked by some factor, such as global popularity, total hours consumed, or a ratio of hours to price. Only a highest ranked number of channels or services may be displayed in the table. In an embodiment, different visualization techniques may be utilized, such as tabbed sections, bar charts, pie charts, time graphs of hours as a function of the date of consumption, and so forth. Hours of consumption may furthermore be compared across multiple time periods (e.g. months, subscription periods, etc.), for each individual channel or service, and/or in aggregate for all channels or services.

In an embodiment, in both the depicted interface and in any other report described herein where hours are mentioned as a measurement of time, different units of time may be utilized instead of hours, such as minutes or days. Times may be rounded to the nearest unit, or expressed in fractions or decimals.

FIG. 5 is a screenshot of an example graphical interface 500 for comparing a current content consumption strategy to a number of alternative strategies, according to an embodiment. Interface 500 comprises a first section 510 that displays a number of channels and a percent of total consumption time that was spent watching each of the listed channels. Of course, hours or other units of time may be utilized instead of percentages. Section 510 may list all channels that have been watched or are available, scrolling the table if necessary, or may be limited to a selected group of channels (e.g. user-selected channels, channels from a certain source or group of sources, or highly ranked channels according to an algorithm such as described above). Section 520 displays the current source of each channel listed in section 510. As depicted, the current sources are all cable subscription packages, though in other embodiments the current source may be any source, including pay-per-view, streaming, or free sources.

Sections 532 and 534 display alternative sources for each channel listed in section 510, along with the cost savings of the alternative source. If no alternative source is available, none is listed. There may be any number of additional sections such as sections 532 and 534, depending on the embodiment. Or, sections 532 and/or 534 may be omitted.

Section 532 may correspond to a highest-ranked alternative source, whereas section 534 may correspond to a second highest-ranked alternative source. The alternative sources may be ranked by a variety of factors, either with respect solely to the channel for which the source is an alternative, or with respect to a complete group of channels. In the former case, alternative sources may be ranked, for instance, solely by their costs savings. In the latter case, each alternative source corresponds to a different overall content consumption strategy, and may thus be ranked by their respective content consumption strategy scores. In fact, in the depicted embodiment, the first alternative source is a cable package that only saves a total of $18 per month, while the second alternative source is a free OTA source that would save a total of $35 per month. However, since the second alternative source would result in a content consumption strategy that lacked access to a channel that is watched 69% of the time, the second alternative source is considered to be part of a less effective content consumption strategy than the first alternative source, and is therefore ranked lower.

Interface 500 further comprises a recommendation section 530 that informs the users of any changes that are suggested based on the viewer's recent viewing behavior. In an embodiment, a change corresponding to the highest ranked content consumption strategy is used. In an embodiment, a change is instead only recommended if the change does not omit any channels watched during the time period for which interface 500 provides statistics.

FIG. 6 is a screenshot of an example graphical interface 600 for reporting information about previous content consumption strategies and recommending changes for future content consumption, according to an embodiment. Interface 600 comprises a section 610 that lists different streaming sources. As with the channels in interface 500, all streaming sources may be displayed, or only a select group of streaming sources may be displayed. Interface 600 further includes a section 612 that indicates the total number of hours consumed watching each individual streaming source. Interface 600 further comprises a section 614 that shows the current subscription status of each source. Statuses may include "subscribed," "unsubscribed," "unknown," "pay content only," and so forth. Statuses may also indicate when the subscription is set to expire or renew. Interface 600 further includes a section 630 with a recommended course of action, if any, for each streaming source. For example, for two streaming sources, no action is recommended, because the currently suggested content consumption strategy includes those two streaming sources. For a last streaming source, the recommended course of action is to unsubscribe from the source, since no time was spent consuming content from the source recently, and the source does not form part of the currently suggested content consumption strategy.

Of course, the interfaces depicted in FIGS. 3-6 are but a few of the many possible interfaces that may be generated in the course of practicing the described techniques. Other interfaces may include different views of the depicted data, views of other types of data or more detailed data, additional or fewer interface controls, additional or fewer recommendations, different arrangements of visual elements, and so forth.

For instance, in another embodiment, an interface similar to one of the above interfaces might include a section for displaying hours spent watching pay-per-view content. A similar interface might also include controls for requesting a breakdown, either per channel or in aggregate, of how much time was spent watching content associated with specific metadata attributes, such as a specific genre, content type, series, title, etc., in a format such as shown in interface 400. Interfaces may further or instead report statistics such as described above for individual content items or groups of content items. For instance, although interfaces 400 and 500 depict information with respect to channels, it will be appreciated that a similar approach may be utilized for portals or individual content items in place of channels, or with a mix of channels, individual content items, and/or portals.

The depicted interfaces provide statistics for a time period of 30 days, or one month. In some embodiments this time period may be smaller or greater. In fact, in an embodiment, custom time periods may be selected by a user. Selection of a custom time period may, in certain embodiments, instruct the client device to make or request new recommendations that are based on consumption behavior for the time period selected rather than 30 days or one month. In other embodiments, recommendations are based on larger time periods than the time periods for which statistics are depicted, and hence selection of a different time period does not affect recommendations.

In an embodiment, program logic for generating the above interfaces, and for collecting the types of data necessary to generate the above interfaces, may be performed in systems other than those described with respect to systems 100 and 200. For example, in an embodiment, a web application executing on a website may include an interface for a user to input hours spent watching channels, or lists of content that the user has watched or intends to watch. The user may compose such a list himself or herself, or the user may instruct such a website to import such data from a client device, content provider, and/or service provider. The web application may then perform various analysis steps such as described herein, and generate the above interfaces. The web application may furthermore be able to communicate with certain content distribution systems to effect recommended changes, in an embodiment.

4.0. Functional Overview

Figure 7:
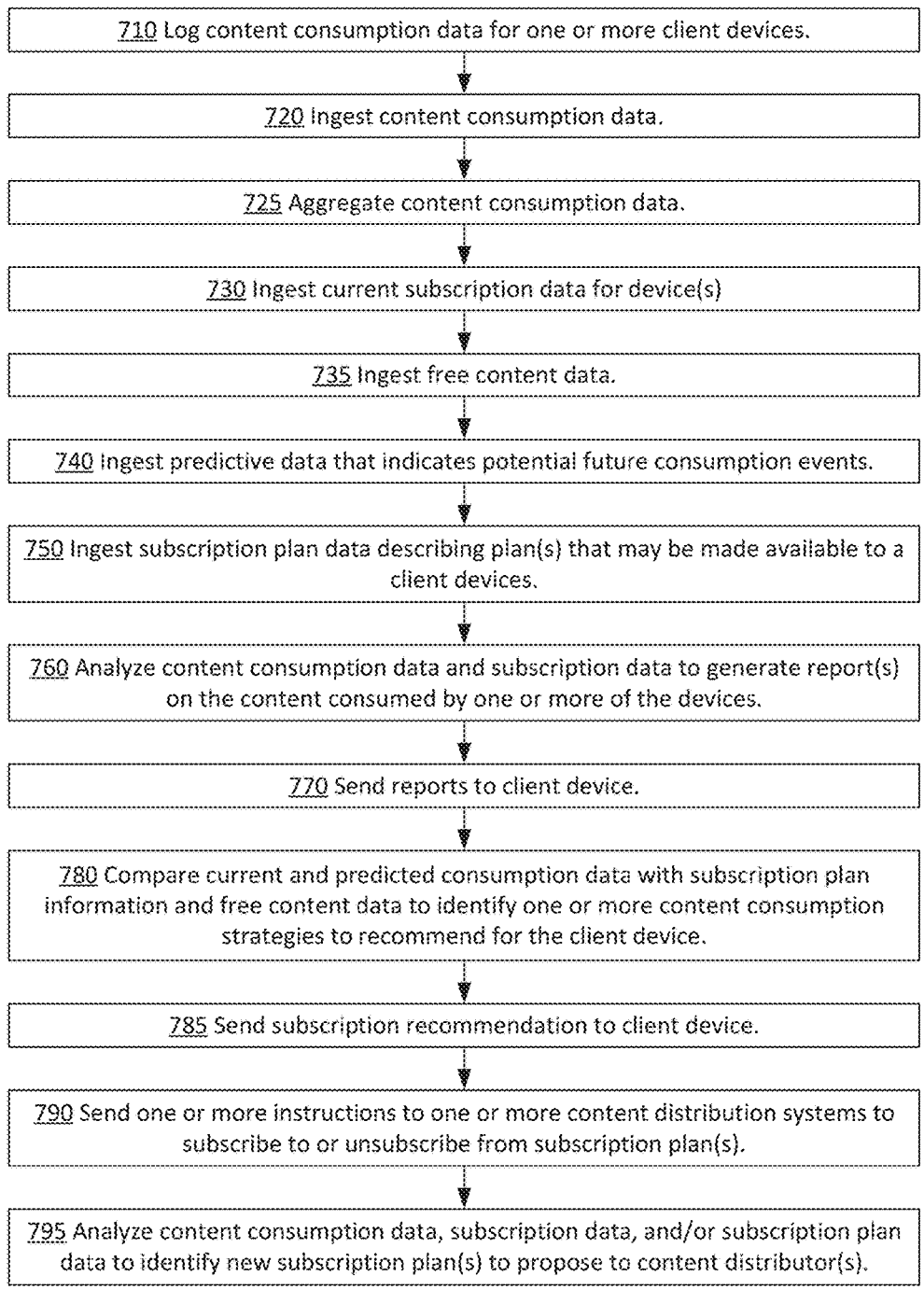
FIG. 7 illustrates an example flow for optimizing content consumption strategies.

FIG. 7 illustrates an example flow 700 for optimizing content consumption strategies, according to an embodiment. The various elements of flow 700 may be performed in a variety of systems, including systems such as system 200 described above. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Block 710 comprises logging content consumption data for one or more client devices, such as client devices 110. Consumption data may be logged at the client devices themselves, and/or at a service provider system or one or more content distribution systems. Content consumption data may include any information about content consumption events, such as occur when content is watched or played. Content consumption data may take any suitable form, including, for example, consumption events 214. For any single content consumption event, the content consumption data may identify, among other aspects, a specific content item that was consumed, a channel on which the content was consumed, a streaming service by which the content was consumed, and/or a source from which the content was consumed. An event may further identify an amount of time for which the content was consumed. Consumption data may describe each individual event, or aggregate the events (e.g. by indicating a total amount of time a channel, service, or item was consumed over a period of time).

Block 720 comprises ingesting content consumption data from the one or more client devices. For example, client devices and/or content distribution servers may send content consumption data to a logger within a subscription optimization system, or otherwise make the content consumption data available. Content consumption data may be reported as events occur, or in batches on a periodic or other basis.

Block 725 comprises aggregating the content consumption data. For instance, based on the content consumption data, a subscription optimization system may generate a device-specific and/or account-specific list of all content consumed by each device and/or account (if multiple devices or accounts are being logged), along with the corresponding source types. The list may indicate channels, services, individual content items, and/or categories or genres of content that have been consumed, optionally with some quantity such as an amount of time or a number of events. Sources may include one or more subscription packages to a channel, group of channels, portal, and/or group of portals. A single subscription package may be associated with certain content distribution systems, whereas there may be multiple subscription packages for other content distribution systems. Sources may also include pay-per-view content distribution services and/or free portals or channels.

Block 730 comprises ingesting subscription data, such as subscription events 722, indicating some or all of the subscription-based sources that are currently available for each device whose content consumption data was logged in block 710. A source is considered to be available to a device if the device is currently configured such that the device can access content from the source. With respect to subscription-based sources, this means that the device, or an account associated with the device, is subscribed to the source.

Block 735 comprises ingesting free content data for some or all of the free sources that are currently available to a client device. The free content, which may also take the form of subscription events 212, may include content from one or more OTA sources, cable sources, or portals. With respect to OTA sources, a source is considered to be available if either the device has verified that it can clearly receive a signal from the OTA source, or the device reports to be in area wherein signals for the OTA should be receivable (e.g. as indicated by zip code or address), depending on the embodiment.

Block 740 comprises optionally ingesting predictive data that indicates future consumption events (i.e. content that a client device may consume in the future). The predictive data may be ingested from the client device itself. For example, the client device may be configured to send events indicating upcoming recordings that are scheduled to occur, and/or items that a user has implicitly or explicitly expressed an interest in, such as wish lists or bookmarks. The predictive data may also or instead be ingested from a recommendation engine configured to identify content whose metadata indicates that it is related to content previously consumed at the client device and/or content that is recommended based on similarities between previous or predicted consumption events for the client device and previous or predicted consumption events for other client devices. Predicted events may include or be tagged with scores indicating the predicted likelihood of the event actually occurring.

Block 750 comprises ingesting subscription plan data describing some or all of subscription plans that may be made available to a client device. For instance, this information may be uploaded by a content distributor, learned by crawling a content distributor website, entered by employees of a service provider, and so forth. The subscription plan information may include, for example, pricing for each subscription plan. Certain plans may only be applicable to certain devices (e.g. because of restrictions on geography or device types), and hence data describing those restrictions may furthermore be included. The ingested information may further include, for example, information about temporary promotions or incentives that affect the described subscription plans. Moreover, EPG data, portal catalogs or listings, and/or other data indicating what channels or specific content items are available via which source may also be ingested at this time, even for sources that do not require subscriptions.

Block 760 comprises analyzing the content consumption data and subscription data to generate reports on the content consumed from some or all of the sources available on one or more devices. The reports may be device-specific, or account-specific if there are multiple client devices associated with a single account. The report may be generated on the device itself, by a service provider system, or by a content distribution system. Example reports are described in other sections of this application. Block 770 comprises sending the report to the client device, if the report was not generated by the client device. Such information, even in absence of the remaining blocks of flow 700, may be useful in helping a user optimize his or her own content consumption activities.

Block 780 comprises comparing the content consumption data and predicted consumption data with the subscription plan information and free content data to identify one or more content consumption strategies to recommend for a client device. If the content consumption strategies are different than the device's current content consumption strategy, as indicated by the device's current subscription data, changes to existing subscriptions may be recommended as well. The comparison may consider a variety of factors, including the quality or quantity of content available via each source, the cost of each source, existing and predictive consumption trends, and so forth, such as described with respect to the operation of subscription optimization engine 260 and elsewhere herein. Block 785 comprises sending the one or more recommendations to the client device, if the recommendations are made outside of the client device, where they may be displayed in reports and/or used to reconfigure the client device, with or without confirmation input from a user. Alternatively, block 785 may comprise sending the recommendations to another device, such as via a web page or mobile app.

Block 790 comprises sending one or more instructions to one or more content distribution systems to subscribe to or unsubscribe from one or more subscription plans, in accordance with the one or more recommendations. Performance of block 790 may or may not be conditioned upon receiving input confirming that a user agrees to the recommended subscription plans. Block 790 would not be performed for subscription changes that the client device or service provider is unable to make because of lack of integrations with the relevant content distribution system. Instead, a user must manually contact the content distributor to instruct the content distributor to make such subscription changes.

Block 795 comprises optionally analyzing content consumption data, subscription data, and/or subscription plan data to identify one or more new subscription plans to propose to one or more content distributors, as described in other sections.

Flow 700 is but one example method for practicing the described techniques. Other methods may include fewer or additional elements, in varying arrangements. For example, a number of blocks, including, without limitation, blocks 730, 735, 740, 780, 790, and 795, may be optional depending on the embodiment. As another example, if block 795 is performed, blocks such as 740 and 760-790 may be optional. The order of the elements in flow 700 is not intended to necessarily indicate any chronological relationship between each block, as it will be clear that certain blocks, such as blocks 710-750, may be performed concurrently with other blocks, or on a perpetual basis. Moreover, some or all elements of flow 700 may be repeated multiple times with respect to multiple different devices or user accounts.

5.0. Example Embodiments

Examples of some embodiments are represented, without limitation, in the following clauses:

According to an embodiment, a system comprises: a content consumption logging component, implemented at least partially by hardware at one or more computing devices, configured to record consumption data describing particular content consumed by one or more media devices; a distributor data aggregator component, implemented at least partially by hardware at one or computing devices, configured to record distributor data describing sources of media content from one or more content distribution systems; a reporting engine, implemented at least partially by hardware at one or more computing devices, configured to generate, based on the consumption data, one or more content consumption reports for a given media device of the one or more media devices, the one or more content consumption reports indicating content consumption statistics for at least two or more channels, services, or items of the particular content; a subscription optimization engine, implemented at least partially by hardware at one or more computing devices, configured to, based at least on the consumption data and the distributor data, identify at least one content consumption strategy for the given media device, the content consumption strategy recommending to configure the given media device with a particular subscription to a particular subscription-based source of the sources.

In an embodiment, the sources include at least two or more subscription-based sources, including the particular subscription-based source.

In an embodiment, the system further comprises: a client subscription management interface configured to communicate with the one or more content distribution systems to request the particular subscription for a particular account that is associated with the given media device.

In an embodiment, the client subscription management interface is further configured to request the particular subscription automatically, without intervening user input.

In an embodiment, the subscription optimization engine is further configured to identify the content consumption strategy by ranking each given strategy of a plurality of possible content consumption strategies by a score that is a function of one or more: total cost of the strategy, or how much content previously consumed by the given media device would be available to the given media device under the strategy.

In an embodiment, the subscription optimization engine is further configured to identify predicted consumption events based on one or more of: scheduled data indicating scheduled recordings at the given media device, interest data indicating content in which a user of the given media device has implicitly or explicitly expressed an interest, or recommendation data from a recommendation engine recommending content for the given media device to consume, wherein the score for a given strategy is further a function of which of the predicted consumption events would be possible for the given media device under the given strategy.

In an embodiment, the content consumption strategy recommends using at least one free source to consume free content at the given media device.

In an embodiment, the system further comprises: a listing aggregation engine configured to provide the one or more media devices with aggregated content listings describing specific content items available via the sources, the aggregated content listings including metadata for the specific content items, the metadata including genres, titles, and descriptions; wherein the one or more content consumption reports include at least one report that indicates how much content having certain metadata has been consumed from each of at least some of the sources by a set of one or more media devices tied to a given account, the set including the given media device.

In an embodiment, the system further comprises a distributor subscription planning engine configured to, based on the consumption data, generate recommendations of new subscription plans for a first content distribution system, of the one or more content distribution systems, to offer to particular media devices of the one or more media devices.

In an embodiment, the content consumption statistics include an overall amount of time that the given device, or any other device associated with a same user account, spent consuming the two or more channels, services, or items of the particular content.

In an embodiment, the given media device is a digital video recorder, smartphone, television, computer, set-top box, or tablet.

In an embodiment, the sources include at least one over-the-air television station, at least one cable or satellite subscription package, and at least one Internet-based streaming media service.

In an embodiment, the consumption data indicates how much time each of the one or more media devices spent consuming content from each of a plurality of channels.

In an embodiment, the consumption data indicates how much time each of the one or more media devices spent consuming content from each of a plurality of streaming media sources.

In an embodiment, the consumption data indicates how much time each of the one or more media devices spent consuming content from each of a plurality of content items, the content items including specific television programs and/or movies.

In an embodiment, the content consumption strategy recommends using at least one pay-per-view source to consume pay-per-view content at the given media device.

In an embodiment, the distributor data includes content availability data for at least two or more of the sources, the content availability data indicating, for a given source, what channels and/or content items are available via the given source.

According to an embodiment, a method comprises: accessing consumption data describing particular content consumed by one or more media devices associated with a user account; accessing distributor data describing sources of media content from one or more content distribution systems; generating, based on the consumption data, one or more content consumption reports for the user account, the one or more content consumption reports indicating content consumption statistics for at least two or more channels, services, or items of the particular content; based at least on the consumption data and the distributor data, identifying at least one content consumption strategy for the user account, the content consumption strategy recommending to add or remove a particular subscription for the user account to a particular subscription-based source of the sources.

In an embodiment, the method further comprises sending a request to a particular content distribution system of the one or more content distribution systems to add or remove the particular subscription for the user account.

In an embodiment, the method further comprises sending the request automatically, without intervening user input.

In an embodiment, the method further comprises sending instructions to the one or more media devices that reconfigure the one or more media devices to reflect the addition or removal of the particular subscription.

In an embodiment, the reconfiguring involves changing the manner in which the one or more media devices interact with the one or more content distribution systems, and/or changing one or more listings of content to show that different content is available to the one or more media devices on account of the addition or removal of the particular subscription.

In an embodiment, the method further comprises identifying the content consumption strategy by ranking each given strategy of a plurality of possible content consumption strategies by a score that is a function of one or more: total cost of the strategy, or how much content previously consumed by the one or more media devices would be available to the one or more media devices under the strategy.

In an embodiment, the method further comprises: identifying predicted consumption events based on one or more of: scheduled data indicating scheduled recordings at the one or more media devices, interest data indicating content in which a user of the user account has implicitly or explicitly expressed an interest, or recommendation data recommending content for the user of the user account to consume based at least in part on the consumption data; wherein the score for a given strategy is further a function of which of the predicted consumption events would be possible for the given media device under the given strategy.

In an embodiment, the method further comprises, based on the consumption data, generating recommendations of new subscription plans for a first content distribution system, of the one or more content distribution systems, to offer to the one or more media devices.

In an embodiment, the one or more media devices are a plurality of media devices.

In an embodiment, the one or more media devices include a digital video recorder and a smartphone or tablet.

In an embodiment, the sources include at least one free source, at least one cable or satellite subscription package, and at least one Internet-based streaming media service.

In an embodiment, the content consumption strategy recommends using at least one pay-per-view source to consume pay-per-view content at the given media device.

In an embodiment, the one or more content consumption reports include at least one report that indicates how much time the one or more media devices have spent consuming content from each of a plurality of channels over a certain period of time.

In an embodiment, the one or more content consumption reports include at least one report that indicates how much time the one or more media devices have spent consuming content from each of a plurality of streaming media sources over a certain period of time.

In an embodiment, the one or more content consumption reports include at least one report that indicates how much time the one or more media devices have spent consuming each of a plurality of specific content items over a certain period of time, the specific content items including specific television programs and/or movies.

In an embodiment, the one or more content consumption reports include at least one report that indicates how much time the one or more media devices have spent consuming content from each of a plurality of genres or content categories over a certain period of time.

In an embodiment, the one or more content consumption reports include at least one report that indicates how much time the one or more media devices have spent consuming content from each of a plurality of subscription-based sources over a certain period of time.

In an embodiment, the distributor data includes content availability data for at least two or more of the sources, the content availability data indicating, for a given source, what channels and/or content items are available via the given source.

Other examples of these and other embodiments are found throughout this disclosure.

6.0. Implementation Mechanism—Hardware Overview

According to one embodiment, the techniques described herein are implemented by one or more special-purpose computing devices. The special-purpose computing devices may be desktop computer systems, portable computer systems, handheld devices, smartphones, media devices, gaming consoles, networking devices, or any other device that incorporates hard-wired and/or program logic to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques.

Figure 8:
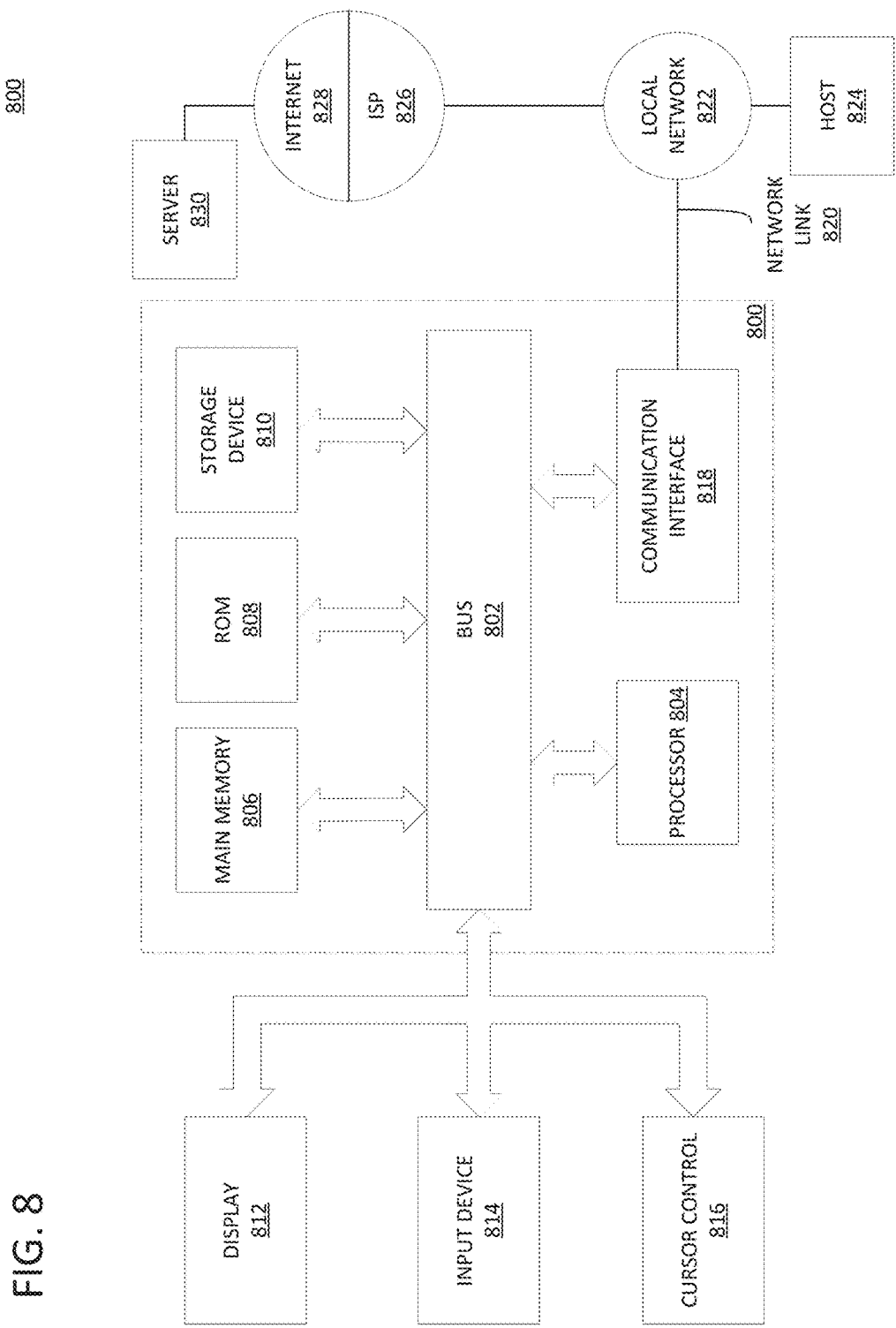
FIG. 8 is block diagram of a computer system upon which embodiments of the invention may be implemented.

FIG. 8 is a block diagram that illustrates a computer system 800 utilized in implementing the above-described techniques, according to an embodiment. Computer system 800 may be, for example, a desktop computing device, laptop computing device, tablet, smartphone, server appliance, computing mainframe, multimedia device, handheld device, networking apparatus, or any other suitable device.

Computer system 800 includes one or more busses 802 or other communication mechanism for communicating information, and one or more hardware processors 804 coupled with busses 802 for processing information. Hardware processors 804 may be, for example, a general purpose microprocessor. Busses 802 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 800 also includes a main memory 806, such as a random access memory (RAM) or other dynamic or volatile storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes one or more read only memories (ROM) 808 or other static storage devices coupled to bus 802 for storing static information and instructions for processor 804. One or more storage devices 810, such as a solid-state drive (SSD), magnetic disk, optical disk, or other suitable non-volatile storage device, is provided and coupled to bus 802 for storing information and instructions.

Computer system 800 may be coupled via bus 802 to one or more displays 812 for presenting information to a computer user. For instance, computer system 800 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 812 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 812.

In an embodiment, output to display 1112 may be accelerated by one or more graphics processing unit (GPUs) in computer system 1100. A GPU may be, for example, a highly parallelized, multi-core floating point processing unit highly optimized to perform computing operations related to the display of graphics data, 3D data, and/or multimedia. In addition to computing image and/or video data directly for output to display 1112, a GPU may also be used to render imagery or other video data off-screen, and read that data back into a program for off-screen image processing with very high performance. Various other computing tasks may be off-loaded from the processor 1104 to the GPU.

One or more input devices 814 are coupled to bus 802 for communicating information and command selections to processor 804. One example of an input device 814 is a keyboard, including alphanumeric and other keys. Another type of user input device 814 is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. Yet other examples of suitable input devices 814 include a touch-screen panel affixed to a display 812, cameras, microphones, accelerometers, motion detectors, and/or other sensors. In an embodiment, a network-based input device 814 may be utilized. In such an embodiment, user input and/or other information or commands may be relayed via routers and/or switches on a Local Area Network (LAN) or other suitable shared network, or via a peer-to-peer network, from the input device 814 to a network link 820 on the computer system 800.

A computer system 800 may implement techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and use a modem to send the instructions over a network, such as a cable network or cellular network, as modulated signals. A modem local to computer system 800 can receive the data on the network and demodulate the signal to decode the transmitted instructions. Appropriate circuitry can then place the data on bus 802. Bus 802 carries the data to main memory 806, from which processor 804 retrieves and executes the instructions. The instructions received by main memory 806 may optionally be stored on storage device 810 either before or after execution by processor 804.

A computer system 800 may also include, in an embodiment, one or more communication interfaces 818 coupled to bus 802. A communication interface 818 provides a data communication coupling, typically two-way, to a network link 820 that is connected to a local network 822. For example, a communication interface 818 may be an integrated services digital network (ISDN) card, cable modem, satellite modem, or a modem to provide a data communication connection to a corresponding type of telephone line. As another example, the one or more communication interfaces 818 may include a local area network (LAN) card to provide a data communication connection to a compatible LAN. As yet another example, the one or more communication interfaces 818 may include a wireless network interface controller, such as a 802.11-based controller, Bluetooth controller, Long Term Evolution (LTE) modem, and/or other types of wireless interfaces. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by a Service Provider 826. Service Provider 826, which may for example be an Internet Service Provider (ISP), in turn provides data communication services through a wide area network, such as the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

In an embodiment, computer system 800 can send messages and receive data, including program code and/or other types of instructions, through the network(s), network link 820, and communication interface 818. In the Internet example, a server 830 might transmit a requested code for an application program through Internet 828, ISP 826, local network 822 and communication interface 818. The received code may be executed by processor 804 as it is received, and/or stored in storage device 810, or other non-volatile storage for later execution. As another example, information received via a network link 820 may be interpreted and/or processed by a software component of the computer system 800, such as a web browser, application, or server, which in turn issues instructions based thereon to a processor 804, possibly via an operating system and/or other intermediate layers of software components.

In an embodiment, some or all of the systems described herein may be or comprise server computer systems, including one or more computer systems 800 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

7.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
    a content consumption logging component, implemented at least partially by hardware at one or more computing devices, configured to record consumption data describing particular content consumed by one or more media devices;
    a distributor data aggregator component, implemented at least partially by hardware at one or computing devices, configured to record distributor data describing sources of media content from one or more content distribution systems;
    a reporting engine, implemented at least partially by hardware at one or more computing devices, configured to generate, based on the consumption data, one or more content consumption reports for a given media device of the one or more media devices, the one or more content consumption reports indicating content consumption statistics for at least two or more channels, services, or items of the particular content;
    a subscription optimization engine, implemented at least partially by hardware at one or more computing devices, configured to, based at least on the consumption data and the distributor data, identify at least one content consumption strategy for the given media device, the content consumption strategy recommending to configure the given media device with a particular subscription to a particular subscription-based source of the sources.

2. The system of claim 1, further comprising a client subscription management interface configured to communicate with the one or more content distribution systems to request the particular subscription for a particular account that is associated with the given media device.

3. The system of claim 2, wherein the subscription optimization engine is further configured to identify the content consumption strategy by ranking each given strategy of a plurality of possible content consumption strategies by a score that is a function of one or more: total cost of the strategy, or how much content previously consumed by the given media device would be available to the given media device under the strategy.

4. The system of claim 3, wherein the subscription optimization engine is further configured to identify predicted consumption events based on one or more of: scheduled data indicating scheduled recordings at the given media device, interest data indicating content in which a user of the given media device has implicitly or explicitly expressed an interest, or recommendation data from a recommendation engine recommending content for the given media device to consume, wherein the score for a given strategy is further a function of which of the predicted consumption events would be possible for the given media device under the given strategy.

5. The system of claim 1, wherein the content consumption strategy recommends using at least one free source to consume free content at the given media device.

6. The system of claim 1, further comprising:
    a listing aggregation engine configured to provide the one or more media devices with aggregated content listings describing specific content items available via the sources, the aggregated content listings including metadata for the specific content items, the metadata including genres, titles, and descriptions;
    wherein the one or more content consumption reports include at least one report that indicates how much content having certain metadata has been consumed from each of at least some of the sources by a set of one or more media devices tied to a given account, the set including the given media device.

7. The system of claim 1, further comprising a distributor subscription planning engine configured to, based on the consumption data, generate recommendations of new subscription plans for a first content distribution system, of the one or more content distribution systems, to offer to particular media devices of the one or more media devices.

8. The system of claim 1, wherein the sources include at least two or more subscription-based sources, including the particular subscription-based source.

9. A method comprising:
    accessing consumption data describing particular content consumed by one or more media devices associated with a user account;
    accessing distributor data describing sources of media content from one or more content distribution systems;
    generating, based on the consumption data, one or more content consumption reports for the user account, the one or more content consumption reports indicating content consumption statistics for at least two or more channels, services, or items of the particular content;
    based at least on the consumption data and the distributor data, identifying at least one content consumption strategy for the user account, the content consumption strategy recommending to add or remove a particular subscription for the user account to a particular subscription-based source of the sources.

10. The method of claim 9, further comprising sending a request to a particular content distribution system of the one or more content distribution systems to add or remove the particular subscription for the user account.

11. The method of claim 9, further comprising identifying the content consumption strategy by ranking each given strategy of a plurality of possible content consumption strategies by a score that is a function of one or more: total cost of the strategy, or how much content previously consumed by the one or more media devices would be available to the one or more media devices under the strategy.

12. The method of claim 11, further comprising:
identifying predicted consumption events based on one or more of: scheduled data indicating scheduled recordings at the one or more media devices, interest data indicating content in which a user of the user account has implicitly or explicitly expressed an interest, or recommendation data recommending content for the user of the user account to consume based at least in part on the consumption data;
wherein the score for a given strategy is further a function of which of the predicted consumption events would be possible for the given media device under the given strategy.

13. The method of claim 9, further comprising, based on the consumption data, generating recommendations of new subscription plans for a first content distribution system, of the one or more content distribution systems, to offer to the one or more media devices.

14. The method of claim 9, wherein the one or more media devices are a plurality of media devices.

15. One or more non-transitory computer-readable media storing instructions that, when executed by one or more computing devices, cause:
accessing consumption data describing particular content consumed by one or more media devices associated with a user account;
accessing distributor data describing sources of media content from one or more content distribution systems;
generating, based on the consumption data, one or more content consumption reports for the user account, the one or more content consumption reports indicating content consumption statistics for at least two or more channels, services, or items of the particular content;
based at least on the consumption data and the distributor data, identifying at least one content consumption strategy for the user account, the content consumption strategy recommending to add or remove a particular subscription for the user account to a particular subscription-based source of the sources.

16. The one or more non-transitory computer-readable of claim 15, wherein the instructions, when executed by one or more computing devices, further cause sending a request to a particular content distribution system of the one or more content distribution systems to add or remove the particular subscription for the user account.

17. The one or more non-transitory computer-readable of claim 15, wherein the instructions, when executed by one or more computing devices, further cause identifying the content consumption strategy by ranking each given strategy of a plurality of possible content consumption strategies by a score that is a function of one or more: total cost of the strategy, or how much content previously consumed by the one or more media devices would be available to the one or more media devices under the strategy.

18. The one or more non-transitory computer-readable of claim 17, wherein the instructions, when executed by one or more computing devices, further cause:
identifying predicted consumption events based on one or more of: scheduled data indicating scheduled recordings at the one or more media devices, interest data indicating content in which a user of the user account has implicitly or explicitly expressed an interest, or recommendation data recommending content for the user of the user account to consume based at least in part on the consumption data;
wherein the score for a given strategy is further a function of which of the predicted consumption events would be possible for the given media device under the given strategy.

19. The one or more non-transitory computer-readable of claim 15, wherein the instructions, when executed by one or more computing devices, further cause, based on the consumption data, generating recommendations of new subscription plans for a first content distribution system, of the one or more content distribution systems, to offer to the one or more media devices.

20. The one or more non-transitory computer-readable of claim 15, wherein the one or more media devices are a plurality of media devices.

* * * * *